United States Patent Office
3,775,495
Patented Nov. 27, 1973

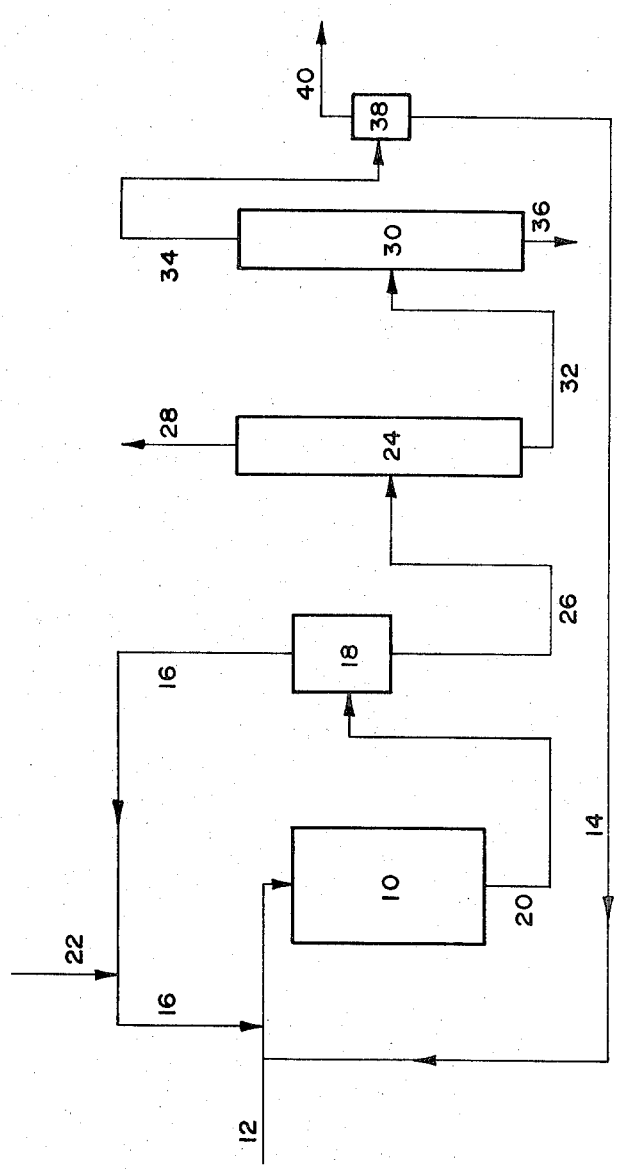

3,775,495
HYDROCARBON CONVERSION
Henri Robert Debus, Meise, Marcel Van Tongelen, Diegem, and Raymond M. Cahen, Pierre, Belgium, assignors to Labofina S.A., Brussels, Belgium
Filed May 10, 1972, Ser. No. 251,864
Claims priority, application France, July 13, 1971, 7125592
Int. Cl. C07c 5/18
U.S. Cl. 260—668 D                                    9 Claims

ABSTRACT OF THE DISCLOSURE

Polyalkylbenzenes having the same number of carbon atoms as the feed consisting of gem structured polyalkylcyclohexanes are produced with an acidic, difunctional dehydrogenation-isomerization catalyst in a reaction zone maintained at a temperature in the range of from 200 to 600° C. and a pressure no greater than 750 p.s.i. A preferred process includes the production of durene from gem-tetromethylcyclohexanes.

This invention relates to hydrocarbon reforming operations. In another aspect, the invention relates to the production of polyalkylbenzenes. In still another aspect this invention relates to the production of polymethylbenzenes, such as durene, from gem structured polyalkylcyclohexanes.

Polymethylbenzenes are conventionally used for the production of aromatic polycarboxylic acids, for example, phthalic acids, from xylenes, pyromellitic acid or anhydride from durene, trimesic acid from trimethylbenzene, and the like. The commercial importance of these aromatic polycarboxylic acids has been steadily growing the last few years, since they are useful raw materials for the manufacture of synthetic resins.

Various methods are known in the art for production of polymethylbenzenes used in the production of the above mentioned aromatic polycarboxylic acids and anhydrides. One prior art method for producing tetramethylbenzenes includes the alkylation of methylbenzenes with methanol over an acidic catalyst. Another prior art method includes alkylation of pseudo cumene or its methyl isomers with methylchloride, using $AlCl_3$ as the catalyst. Furthermore, another such prior art method includes condensation of 2 moles of trimethylbenzene with 1 mole of formaldehyde followed by cracking of the resulting condensation product to form tetramethylbenzene and trimethylbenzene.

The object of this invention is to provide a novel process for the production of polyalkylbenzenes.

Another object of this invention is to provide a process for the production of polyalkylbenzenes from gem structured polyalkylcyclohexanes.

Still another object of this invention is to provide a novel process for the production of polymethylbenzenes from polyalkylcyclohexanes.

A further object of this invention is to provide a novel process for the production of durene from readily available materials.

According to the invention, polyalkylbenzenes having the same number of carbon atoms as a polyalkylcyclohexane feed are produced from a polyalkylcyclohexane feed material having the general structural formula:

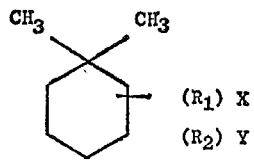

wherein $R_1$ and $R_2$ are aliphatic radicals having at least 1 carbon atom, generally 1 to 3 carbon atoms; X and Y are 0 or 1; and wherein the total number of carbon atoms in said material is at least 8, preferably 8 to 14 carbon atoms inclusive, by contacting the feed material in the presence of hydrogen with an acidic, difunctional dehydrogenation-isomerization catalyst in a reaction zone maintained at a temperature in the range of from 200 to 600° C. and a pressure no greater than 750 p.s.i.

According to the preferred embodiment of this invention, tetramethylbenzenes, including durene, are produced by the above-described process from a feed of gem structured polymethylcyclohexanes.

This invention can be more easily understood from a study of the drawing which is a schematic flow diagram of a preferred process of this invention used for producing durene.

Now referring to the drawing, a preferred process is illustrated for the production of durene from a gem-tetramethylcyclohexane containing feed. It is to be understood that even though the preferred embodiment of this invention is described in relation to the production of durene from a feed material comprising gem-tetramethylcyclohexane, it is within the scope of this invention to produce other polyalkylbenzenes having the same number of carbon atoms as in the polyalkylcyclohexane feed employed from a gem structured polyalkylcyclohexane having a general structural formula as set forth above. Examples of other products which can be produced by the process of this invention include xylene, trimethylbenzenes, ethylxylenes, pentamethylbenzenes, hexamethylbenzenes, and the like.

This invention is basically a process wherein gem structured polyalkylcyclohexanes are dehydrogenated and isomerized to form corresponding polyalkylbenzenes. The basic reaction of the subject invention is carried out in reactor 10 which contains a suitable acidic, difunctional dehydrogenation-isomerization catalyst. The preferred catalysts include noble metals, e.g. platinum, ruthenium, rhodium, rhenium, palladium, osmium, and irridium. In addition, alloys of these metals can be used, for example an alloy of platinum and rhenium. Preferably, catalytic amounts of the platinum group metal are carried upon members selected from silica, alumina, silica-alumina, zeolitic compounds, and mixtures thereof. Based upon percent conversion and selectivity, the preferred catalyst system includes from between about 0.1 to 5 weight percent of platinum, and more preferably from about 0.2 to 3 weight percent of platinum on an amorphous or crystalline silica-alumina carrier of 5 to 95 weight percent of silica, preferably 10 to 50 weight percent of silica for amorphous silica-alumina and 30 to 90 weight percent of silica for crystalline silica-alumina.

Reactor 10 is operated at a temperature in the range of from 200 to 600° C., and more preferably in a range of from 300 to 500° C. The most preferable temperature range for durene conversion is from 300 to 475° C. Reactor 10 is operated at a pressure no greater than 750 p.s.i. A more preferred operating pressure of reactor 10 is between atmospheric pressure and 500 p.s.i.

The gem structured polyalkylcyclohexane feed preferably is admixed with a proper ratio of aromatic compounds in reactor 10 in order to obtain improved efficiency of the reaction. The adjuvant aromatics can be admixed with the gem structured polyalkylcyclohexane feed before it is introduced into reactor 10, or they can be introduced separately into the reactor. Preferably the two materials are premixed before they are introduced into reactor 10. It is preferred that the molar ratio of gem structured polyalkylcyclohexanes to aromatics in the reactor be maintained in the range of from 0.1:1 to 4:1.

Based upon such factors as product yield and the availability of suitable aromatics the gem structured polyalkylcyclohexanes are generally admixed with aromatics in a mole ratio from about 0.2:1 to 1:1. The preferred aromatic compounds to be admixed with the feed are polyalklbenzenes. For example, when producing durene from gem-tetramethylcyclohexanes, tetramethylbenzenes such as isodurene and prehnitene are preferred. Other suitable aromatic materials include benzene, toluene, xylenes, trimethylbenzene, ethyltoluene, and the like.

The total hydrogen to hydrocarbon mole ratio of constituents entering reactor 10 is preferably in the range of from 3:1 to 40:1, and more preferably from about 6:1 to 25:1. The process of the present invention produces more than adequate hydrogen for recycle to the reaction zone to provide proper hydrogen to hydrocarbon ratios.

Referring again to the drawing, a suitable gem structured polyalkylcyclohexane, for example, gem-tetramethylcyclohexane is passed into conduit 12 which communicates with the inlet of reactor 10. A suitable source of aromatics, for example tetramethylbenzenes, including isodurene and prehnitene are introduced into the feed via conduit 14. Also, suitable amounts of hydrogen are admixed to the feed via conduit 16. The resulting mixture of gem structured polyalkylcyclohexanes, aromatics, and hydrogen pass to inlet of reactor 10 containing a catalyst of the above described type. The feed is passed through reactor 10 at a rate of from 0.5 to 30 parts by volume per hour per part by volume of catalyst, and more preferably at a rate of between 1 to 20 parts by volume per hour per part by volume of catalyst.

The effluent from reactor 10 is passed via conduit 20 to separation tank 18 wherein the hydrogen is removed from the liquid effluent via conduit 16. As shown in the preferred embodiment illustrated in the drawing, the hydrogen from separation tank 18 is recycled to conduit 12 wherein it is admixed with the feed material. In addition, any hydrogen which it is desired to add to the reaction is admixed into conduit 16 via conduit 22. Excess hydrogen is removed as desired. The liquid effluent from separation tank 18 is passed into distillation column 24 intermediate the ends thereof via conduit 26. Distillation column 24 functions to remove a light fraction via conduit 28. For example, in the production of durene from gem-tetramethylcyclohexanes, a fraction boiling lower than 192° C. is removed via conduit 28, and the heavier fraction is sent to distillation column 30 via conduit 32.

Distillation column 30 functions to remove a product fraction via conduit 34 and a heavier fraction which is removed via conduit 36. For example, in the production of durene, a fraction with a boiling point between 192 and 210° C. is removed from the upper portion of distillation column 30 via conduit 34, while the heavier fraction with a boiling point greater than 210° C. is removed from the lower region of distillation column 30 via conduit 36.

In the preferred embodiment of this invention as illustrated in the drawing, the product is removed from distillation column 30 via conduit 34 and passed into a suitable separation zone 38 whereby durene product is separated from other tetramethylbenzenes. In the preferred embodiment, separation zone 38 is a crystallization zone. Thus, separation zone 38 can be any conventional crystallization apparatus known in the art which is suitable for separating durene from its isomers and other hydrocarbons. For example, the 192–210° C. distillation cut can be chilled to a temperature between 20 and —60° C. to cause the selective crystallization of durene. The resulting crystals of durene are separated from the mother liquor and removed from the crystallization zone 38 via conducting means 40. The mother liquor from the crystallization zone is removed therefrom via conduit 14. As shown in this preferred embodiment, the mother liquor is used as the aromatics fraction which is admixed with the feed passing through conduit 12.

The following examples are given to better facilitate the understanding of this invention and are not intended to limit the scope thereof.

EXAMPLE I

Utilizing a system such as illustrated in the drawing, 100 parts by weight of a gem-polymethylcyclohexane containing feed stream having the composition as set forth in the table below, was introduced into conduit 12 and admixed with 186 parts by weight of filtrate from a crystallization zone, such as separation zone 38. The composition of filtrate is illustrated in the table below.

TABLE—FEED COMPOSITION

| Constituent: | Amount (wt. percent) |
|---|---|
| (A) Feedstream: | |
| $C_9$ components | 2.7 |
| Gem-tetramethylcyclohexane | 78.2 |
| $C_{10}$ (saturated and unsaturated) | 19.1 |
| (B) Filtrate: | |
| Durene | 5.3 |
| Isodurene | 63.8 |
| Prehnitene | 16.6 |
| Other ($C_{10}$ aromatics) | 14.3 |

In addition, 75.6 parts by weight of hydrogen are introduced into conduit 12 and the resultant mixture is passed into reactor 10. The reactor contained 51.9 parts by weight of a catalyst containing 0.8 weight percent platinum on a silica-alumina support containing 30 weight percent silica. The reactor was operated at 425° C. and 150 p.s.i. The feed was passed through the reactor at a space velocity of 4 volumes per hour per volume of catalyst. The effluent from the reactor was passed through separator 18 and distillation columns 24 and 30, and the product obtained from distillation column 30 was passed through a crystallizer in separation zone 38 via conduit 34. The crystallizer was operated at —35° C. and 63 parts by weight of durene crystals were obtained therefrom.

EXAMPLE II

Utilizing a single reactor system, 100 parts by weight of a gem-polymethylcyclohexane containing feed stream having the composition illustrated in the table below was admixed with 125 parts by weight of diethylbenzene and introduced into a reactor.

TABLE—COMPOSITION OF NAPHTHENIC FEED

| Constituent: | Amount (weight percent) |
|---|---|
| $C_9$ | 0.7 |
| Gem-tetramethylcyclohexane | 78.6 |
| Other $C_{10}$ naphthenes | 20.7 |

In addition, 29.6 parts by weight of hydrogen are sent to the reactor, containing 22.6 parts by weight of a catalyst containing 0.8 weight percent platinum on a molecular sieve NaY. The reactor was operated at 425° C. and 200 p.s.i. The feed was passed through the reactor at a space velocity of 6 volumes per hour per volume of catalyst. The reaction product contained 57 parts by weight of tetramethylbenzene and 18 parts by weight unconverted products which can be recycled to the reactor. The composition of the tetramethylbenzene was as follows:

| | Percent |
|---|---|
| Durene | 30.4 |
| Isodurene | 54.2 |
| Prehnitene | 15.4 |

What is claimed is:

1. A process for the conversion of an alkylcyclohexane containing feed in which the alkylcyclohexanes are those having the formula

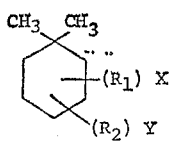

wherein $R_1$ and $R_2$ are aliphatic radicals having at least one carbon atom, X and Y are 0 or 1, and wherein the total number of carbon atoms in said cyclohexanes is at least 8, substantially completely to polyalkylbenzenes of the formula

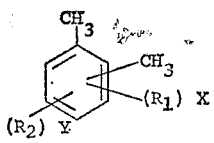

wherein $R_1$, $R_2$, X and Y are the same as above, said process comprising contacting said feed with an acidic, difunctional dehydrogenation-isomerization catalyst comprising a noble metal supported on a material selected from the group consisting of silica, alumina, silica-alumina, zeolitic compounds, and mixtures thereof in the presence of hydrogen in a reaction zone maintained at a temperature within the range of from about 200 to 600° C., and a pressure within the range of from about atmospheric to 750 p.s.i. for a period of time sufficient to cause said alkylcyclohexanes to dehydrogenate and isomerize to yield a reaction product containing essentially only polyalkylbenzenes of corresponding number of carbon atoms and having the identical alkyl substituents as the starting alkylcyclohexanes.

2. The process of claim 1, wherein said catalyst contains from 0.1 to 3 weight percent of platinum as said noble metal.

3. The process of claim 1, wherein the mole ratio of hydrogen to hydrocarbon is maintained in said reaction zone within the range of from about 3:1 to 40:1, and wherein from about 0.5 to 30 volumes of said feed materials are contacted with each volume of catalyst per hour in said reaction zone.

4. The process of claim 1, wherein $R_1$ and $R_2$ are methyl radicals and said polyalkylbenzenes are tetramethylbenzenes.

5. The process of claim 1, further comprising the step of introducing an aromatic hydrocarbon compound into said reaction zone concurrently with said feed material, the mole ratio of said alkylcyclohexanes to said aromatic compound being in the range of from 0.1:1 to 4:1.

6. The process of claim 5, wherein said aromatic hydrocarbon compound comprises primarily polyalkylbenzenes.

7. The process of claim 6, wherein said polyalkylbenzenes substantially comprise position isomers of the desired polyalkylbenzene conversion product.

8. The process of claim 7, wherein said feed contains gem-tetramethyl cyclohexanes and wherein said aromatic hydrocarbon comprises a mixture of isodurene and prehnitene.

9. The process of claim 5, wherein said feed material and said aromatic hydrocarbon are mixed together prior to entry into said reaction zone.

References Cited
UNITED STATES PATENTS 3,652,695   3/1972   Lester _____ 260—668 A
3,159,687   12/1964   Lehman _____ 260—668 A
3,553,276   1/1971   Berger et al. _____ 260—668 A CURTIS R. DAVIS, Primary Examiner U.S. Cl. X.R.

260—668 A